United States Patent [19]

Jose et al.

[11] Patent Number: 4,730,215

[45] Date of Patent: Mar. 8, 1988

[54] COMPATIBLE WIDE SCREEN TELEVISION SYSTEM WITH VARIABLE IMAGE COMPRESSION/EXPANSION

[75] Inventors: David L. Jose, Hamilton Township, Mercer County; Robert A. Dischert, Burlington County, both of N.J.

[73] Assignee: RCA Corporation, Princeton, N.J.

[21] Appl. No.: 869,174

[22] Filed: May 30, 1986

[51] Int. Cl.⁴ .................... H04N 7/01; H04N 11/20
[52] U.S. Cl. ........................ 358/140; 358/11; 358/12; 358/141
[58] Field of Search ............... 358/180, 160, 140, 141, 358/11, 12, 21 R

[56] References Cited

U.S. PATENT DOCUMENTS

| | | | |
|---|---|---|---|
| 4,134,128 | 1/1979 | Hurst | 358/160 X |
| 4,385,324 | 5/1986 | Shioda et al. | 358/237 |
| 4,513,324 | 4/1985 | Poetsch et al. | 358/214 |
| 4,551,754 | 11/1985 | Meise et al. | 358/180 |
| 4,556,906 | 12/1985 | Dischert et al. | 358/180 |
| 4,567,508 | 1/1986 | Hulyer | 358/11 |
| 4,605,952 | 8/1986 | Powers | 358/12 X |
| 4,605,962 | 8/1986 | Christopher et al. | 358/140 |
| 4,651,208 | 3/1987 | Rhodes et al. | 358/140 |
| 4,672,443 | 6/1987 | Dischert et al. | 358/141 X |

FOREIGN PATENT DOCUMENTS 2115640 9/1983 United Kingdom .
2173669 10/1986 United Kingdom .

Primary Examiner—James J. Groody
Assistant Examiner—E. Anne Faris
Attorney, Agent, or Firm—Paul J. Rasmussen; Peter M. Emanuel; Richard G. Coalter

[57] ABSTRACT

A compressor compresses the edges of a wide screen image to provide a compressed wide screen video signal which may be displayed on a conventional 4:3 aspect ratio receiver with the compressed edge portions largely hidden from view because of receiver overscan. Complementary edge expansion restores the compressed signal to its original form for display by a wide screen receiver. The relative proportions of compression applied to the left and right edges of the wide screen images are varied to reduce the appearance of edge distortion in the compressed signal when displayed on a standard aspect ratio receiver and to reduce the appearance of loss of edge resolution in the expanded signal when displayed on a wide screen receiver.

13 Claims, 10 Drawing Figures

Fig. 3

A — WIDE SCREEN CAMERA VIDEO (S1)

| BLANKING | ACTIVE VIDEO 52.6μS | | |
|---|---|---|---|
| 10.9μS | LEFT 10.5μS | CENTER 31.6μSEC | RIGHT 10.5μS |

Total: 1-H = 63.5μS

B — 1100 FH WRITE CLOCK

| BLANKING | LEFT | | | CENTER | RIGHT | | |
|---|---|---|---|---|---|---|---|
| 190 | 52 | 52 | 52 | 598 | 52 | 52 | 52 |

C — PIXELS DELETED

| | | | | | | | |
|---|---|---|---|---|---|---|---|
| −34 | 39 | 26 | 13 | ZERO | 13 | 26 | 39 |

D — COMPRESS MEMORY CONTENTS

| BLANKING | LEFT | | | CENTER | RIGHT | | |
|---|---|---|---|---|---|---|---|
| 156 | 13 | 26 | 39 | 598 | 39 | 26 | 13 |

E — 910 FH READ CLOCK (VIDEO OUT) S2

| BLANKING 156 | 754 PIXELS | | |
|---|---|---|---|
| 10.9μS | 5.25μS | 41.2μS | 5.25μS |

Total: 1-H = 63.5μSEC

Fig. 9

A — COMPATABLE VIDEO IN

| | 1-H = 63.5 μS | | |
|---|---|---|---|
| SYNC | ACTIVE VIDEO 52.6 μS | | |
| 10.9 μS | LEFT 5.25 μS | CENTER 41.2 μS | RIGHT 5.25 μS |

B — 910 FH WRITE CLOCK

| SYNC | 754 PIXELS | | |
|---|---|---|---|
| 156 | LEFT 78 | CENTER 598 | RIGHT 78 |

C — EXPAND MEMORY CONTENTS

| 156 | 13 | 26 | 39 | 598 | 13 | 26 | 39 |

D — PIXELS REPEATED (CLOCK INHIBIT)

| 34 | 39 | 26 | 13 | ZERO | 13 | 26 | 39 |

E — 1100 FH READ CLOCK 5:3 (VIDEO OUT)

| SYNC | LEFT | | | CENTER | RIGHT | | |
|---|---|---|---|---|---|---|---|
| 190 | 52 | 52 | 52 | 598 | 52 | 52 | 52 |
| 10.9 μS | 10.5 μS | | | 31.6 μS | 10.5 μS | | |

COMPATIBLE WIDE SCREEN TELEVISION SYSTEM WITH VARIABLE IMAGE COMPRESSION/EXPANSION

FIELD OF THE INVENTION

This invention relates to wide screen television systems of the type in which compatibility with conventional television receivers is achieved by compressing or "squeezing" the edges of a wide screen image.

BACKGROUND OF THE INVENTION

It has been recognized by Meise et al. in U.S. Pat. No. 4,551,754 entitled COMPATIBLE WIDE SCREEN COLOR TELEVISION SYSTEM which issued Nov. 5, 1985, that a wide screen television signal may be made compatible with conventional television receivers by compressing or "squeezing" the left and right edges of the wide screen image. When displayed on a conventional television receiver, the squeezed edges of the image are largely hidden from view due to receiver overscan. When displayed on a wide screen receiver, the compressed edges are restored to their original width by means of time expansion circuits. In one embodiment of the Meise et al. system, picture edge squeezing is provided by modifying the horizontal drive signal to a camera. In another embodiment, image restoration ("de-squeezing") is provided by means of a memory which stores the video signal in response to a constant frequency write clock and recovers the stored signal in response to a variable frequency read clock. Changing the read clock frequency alters the relative timing of picture elements within a horizontal line thereby facilitating expansion of the compressed edges of the displayed image.

To provide for display of both wide screen and standard aspect ratio (i.e., 4:3) images in a dual mode receiver, Meise et al. propose that a coded signal be added to the vertical blanking interval of the compatible (edge squeezed) wide screen signal for identifying the signal as being representative of a wide screen image. (As used herein, the term wide screen means any aspect ratio greater than 4:3 as used in conventional television displays). The coded signal is detected in the dual mode receiver and used to control the display raster width and the edge expansion circuit. When the code is present, the edge expander circuits are enabled and the raster width is expanded to the full width of a wide screen kinescope. When standard television signals are received, the absence of the code is detected and used to reduce the raster width to provide a 4:3 aspect ratio and the edge expansion circuits are disabled (by-passed).

Similar edge expansion and raster width control arrangements are described in U.S. Pat. No. 4,556,906 of Dischert et al. entitled KINESCOPE BLANKING SCHEME FOR WIDE-ASPECT RATIO TELEVISION which issued Dec. 3, 1985. The teachings of varying the raster width in a receiver for displaying wide and standard aspect ratio images is further exemplified in a projection television system proposed by Shioda et al. in U.S. Pat. No. 4,385,324 entitled WIDE SCREEN PROJECTION APPARATUS which issued May 24, 1983. In the Shioda et al. system a coded signal is also employed for automatically controlling the raster size in a dual mode receiver.

Another example of a compatible wide-screen system is described by K. H. Powers in allowed U.S. patent application Ser. No. 504,374 filed June 14, 1983 (now, U.S. Pat. No. 4,605,952) as a continuation-in-part of application Ser. No. 485,446 filed Apr. 14, 1983 (now abandoned) and entitled COMPATIBLE HDTV SYSTEM EMPLOYING NONLINEAR EDGE COMPRESSION/EXPANSION FOR ASPECT RATIO CONTROL. In the Powers system the center portion of the image is slightly compressed (by about 2.5%) and the compression of the edges of the image ramps linearly to a factor of about 3:1 at the extreme edges. Edge compression is provided in the Powers system by the use of variable clock rate sampling of an analog video signal. The sampling rate is varied by applying the output of a very high frequency (4.374 Giga-Hertz) oscillator to a programmable divider having divisor coefficients stored in a programmable read only memory (ROM). The ROM is addressed by a counter that is clocked during each line interval thereby changing the divisor coefficients and thus changing the sampling frequency to control the edge compression of the sampled video signal.

A further example of a compatible "edge squeeze" type of television system is described by Dischert et al. in U.S. patent application Ser. No. 771,420 entitled COMPATIBLE WIDE SCREEN TELEVISION SYSTEM WITH IMAGE COMPRESSOR/EXPANDER filed Aug. 30, 1985. In the Dischert et al. system memories are provided for storing and recovering each line of a wide aspect ratio video input signal in response to read and write clock pulses. Selected write clock pulses are deleted to compress the edge regions of the wide aspect ratio video input signal. In a receiver, read clock pulses are deleted to restore the compressed signal to its original aspect ratio. The pattern of deleted pulses is altered on a line-by-line basis to reduce visible artifacts caused by decimation (pulse deletion) of the video signal. A dual mode receiver is described which includes provisions for controlling edge blanking, interpolation and the clock pulse deletion pattern as a function of received signals. Wide screen and standard aspect ratio images are displayed in the dual mode receiver without altering the width of the display raster.

SUMMARY OF THE INVENTION

In the described compatible wide screen systems the distortion which occurs in the left and right edges of the picture due to edge "squeezing" is largely hidden from view when the compressed image is displayed on a conventional 4:3 aspect ratio kinescope because of receiver overscan. The amount which is hidden depends, of course, on the adjustment of the receiver horizontal overscan. As a practical matter, on a typical receiver about one-half of the compressed edge region will be visible. In a wide screen receiver the compressed edges are restored to their original width and so there is no visible distortion. There is, however, a loss in horizontal resolution in the edge regions of the decompressed signal when displayed on a wide screen receiver because of the deletion of picture elements (pixels) in the edge compression process. Interpolation of the missing pixels is helpful in improving the edge resolution.

The present invention resides in part in recoginizing the effects of edge distortion in conventional (4:3 aspect ratio) receivers and loss of edge resolution in wide screen receivers and resides in part in recognizing that the visibility of these quite different effects may be substantially reduced by modification of a specific parameter of the compression/decompression process. As will be explained, the principles of the invention provide a desirable reduction in the subjective appearance of edge distortion in conventional receivers and a reduction in the subjective appearance of loss of edge resolution in wide screen displays by providing a controlled relationship between the left-side and right-side image processing.

Video image compression apparatus, embodying the invention, comprises signal source means for providing a video input signal representative of a wide screen image and for providing a compression control signal. A video compression means, coupled to the source, compresses left and right edge regions of the wide screen image and varies the relative proportions of the compressed edge regions as a function of the control signal to provide a processed video output signal representative of a wide screen image having a central region bordered on left and right sides thereof by variably compressed edge regions. A combining means, combines the processed video output signal with the compression control signal for transmission to a utilization means.

Video image expansion apparatus embodying the invention comprises signal source means for providing a video input signal representative of a wide screen image having a central region bordered on left and right sides thereof by variably compressed left and right edge regions and for providing an expansion control signal indicative of the relative proportions of compression of the edge regions. An inverse signal processing means, coupled to the signal source means, expands the edge regions of the video input signal in relative proportions indicated by the expansion control signal to provide a processed video output signal in which the wide screen image is restored to an uncompressed form.

BRIEF DESCRIPTION OF THE DRAWING

The invention is illustrated in the accompanying drawing wherein like elements are devoted by like designators and in which:

FIGS. 2, 3 and 4 are diagrams illustrating operation of the system of FIG. 1;

FIG. 9 is a diagram illustrating operation of the receiver of FIG. 8;

DETAILED DESCRIPTION

As an overview of the principles of the invention, the wide screen system described herein alters the compression and expansion patterns of the compatible wide screen image as a function of the content of scenes being televised. Specifically, as the center of attention of a given scene moves to the left-side of the scene the left-side compression is reduced and the right-side compression is increased. A similar change in compression (and complementary expansion in a receiver) is performed if movement is to the right. By this means, the viewer experiences a desirable psycho-visual effect of a perceived reduction in edge distortion when viewing the screen on a standard aspect ratio receiver because the uncompressed central portion of the scene follows or "tracks" the most important action or "focus" in the scene. The resolution of the expanded screen also is subjectively improved when displayed on a wide screen receiver for the same reason, namely, the viewer's eye will tend to track the action in the scene which is controlled to have the least compression and thus the highest resolution upon expansion. Compressing images in this manner requires an artistic judgment as to where the center of attention of a given scene is located and transmission of that information to the user of the wide screen receiver. The compression information is not needed, of course, in a standard aspect ratio receiver but the visual benefit of subjectively reduced edge distortion will be obtained because of the tendency for the viewer's eye to track the center of attention of the scene which receives the least compression.

The specific examples of the invention which follows utilize aspects of the clock pulse deletion method of compression and expansion described in the aforementioned Dischert et al. application Ser. No. 771,420 but modified, in accordance with the invention, to vary the relative proportions of compression and expansion applied to the edges of processed wide-screen images. As used herein, the term "wide screen" means an image having an aspect ratio greater than the aspect ratio (4:3) of conventional television displays. Although the invention is illustrated in a preferred embodiment using the clock pulse deletion compression method, the principles apply as well to other "edge-squeeze" methods such as those previously described.

Figure 1:
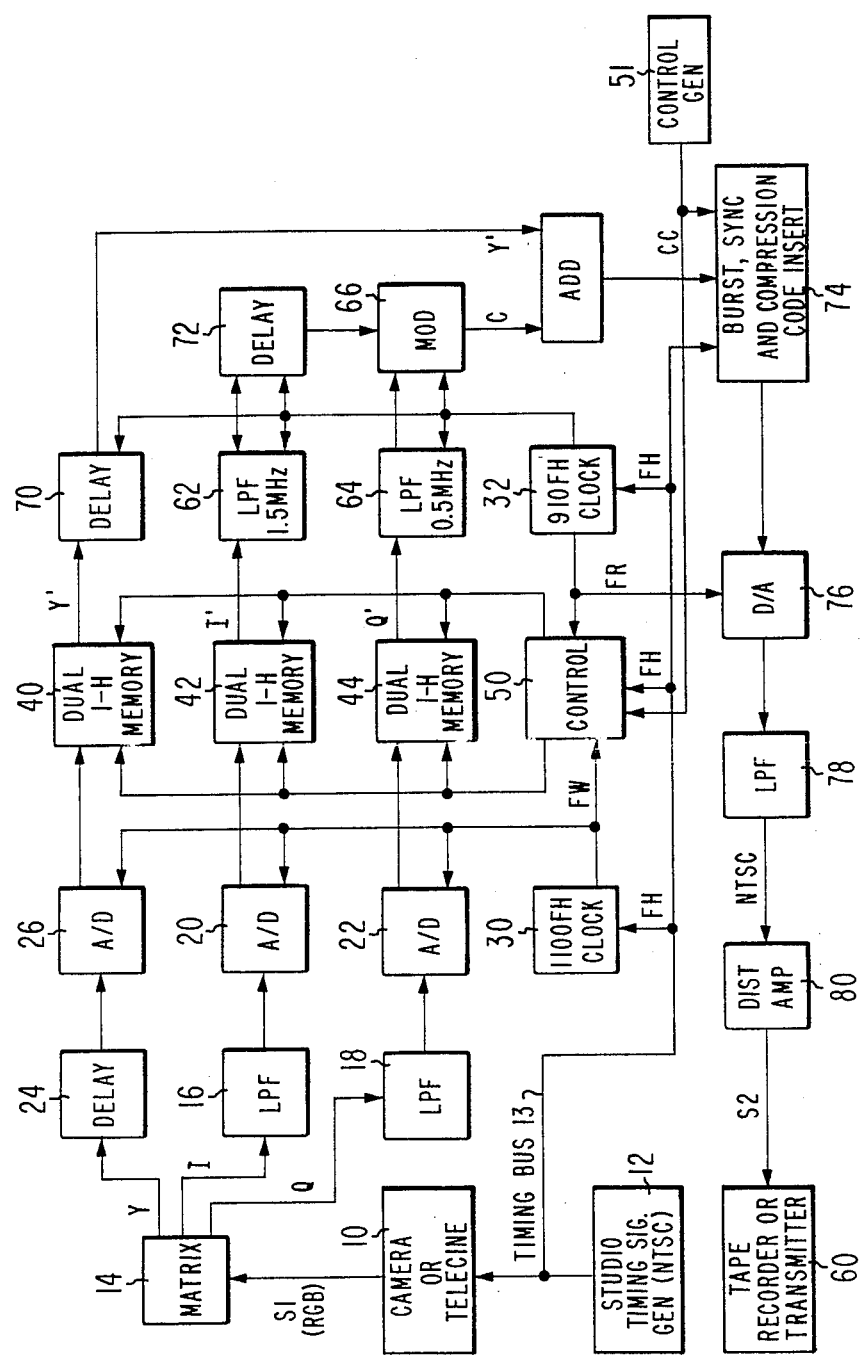
FIG. 1 is a block diagram of a compatible wide screen video signal generating system embodying aspects of the invention.

The compatible wide screen video signal generating system of FIG. 1 comprises a camera (or telecine machine) 10 coupled to a studio timing signal generator 12 which provides standard NTSC timing signals for controlling the line and field rates of the camera. When producing wide screen compatible signals for PAL or SECAM receivers an appropriate timing signal generator should be used. Camera 10 is of conventional design but is adjusted to provide a video output signal S1 in RGB form having a wide aspect ratio (e.g., about 5:3). The adjustment may be done by reducing the amplitude of the vertical sweep signal supplied to the camera imager or, if sufficient target area is available, by increasing the amplitude of the horizontal sweep signal. Similar adjustments may be made to a conventional telecine machine to provide the wide screen video signal S1.

The wide screen video signal S1 is converted to Y, I and Q components by means of a matrix 14. The I and Q components are low pass filtered by anti-aliasing low-pass filters 16 and 18, respectively, and converted to digital form by analog-to-digital (A/D) converters 20 and 22, respectively. The luma signal Y is delayed in unit 24 (to compensate for the delay imparted to the I and Q signals due to low pass filtering) and converted to digital form in converter 26.

Converters 20, 22 and 26 are all clocked by a clock signal FW at a frequency equal to 1100 times the horizontal line frequency of the video signal S1. The clock signal, FW, is provided by a write clock generator 30 coupled via a timing bus 13 to the studio timing signal generator 12 for receiving a horizontal line rate timing signal FH. Preferably, generator 30 is implemented as a phase lock loop to ensure that there are an integer number (1100 in this example of the invention) of clock pulses in each line of the video signal S1. Alternatively, other frequency multiplication techniques may be used to generate the write clock signal FW.

Figure 5:
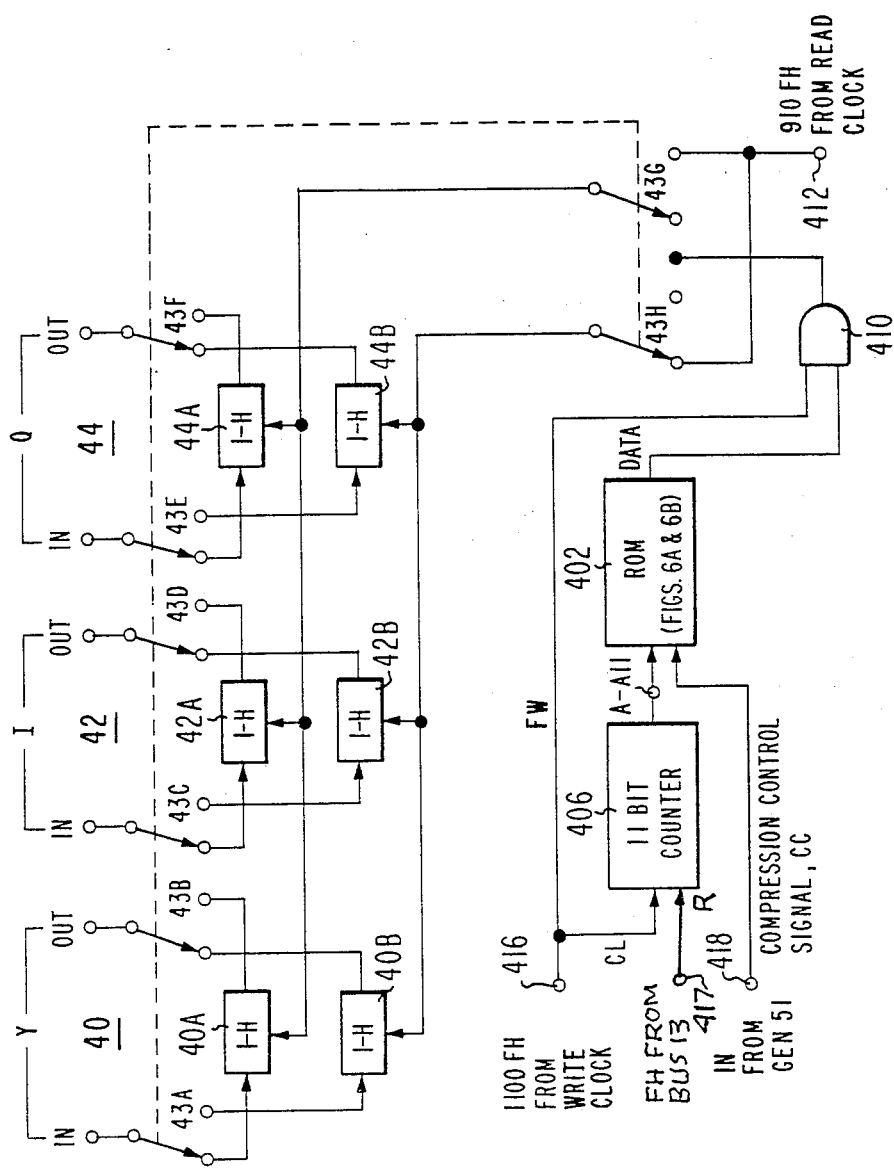
FIG. 5 is a block diagram illustrating details of compression elements of the system of FIG. 1.

The digitized Y, I and Q video signals are applied to respective ones of dual one-line (1-H) memories 40, 42 and 44. Read and write operations of the memories are controlled by a control unit 50 having inputs for receiving the write clock signal FW from clock 30, the read clock signal FR from a read clock generator 32 and a compression control signal CC from compression control generator 51. Generator 51 is a manual control (e.g., a switch, "joy stick" or other suitable device) used by the system operator to control the compression applied to the wide screen signal and to vary the proportions of the left and right edges as will be explained. The frequency of the read clock signal is 910 times the line frequency FH. Clock 32, preferably, is also phase locked to signal FH thereby ensuring that the difference between the number read clock pulses (910) and the number of write clock pulses (1100) per line of video signal S1 is constant. Memories 40-44 and control unit 50 may be implemented as shown in FIG. 5 discussed subsequently.

Memories 40-44, in combination with clocks 30 and 32 and control unit 50, provide the function of squeezing the edges of the wide screen video signal as will be described in detail subsequently. After edge compression, the component signals (Y', I' and Q') are converted to composite form for application to a tape recorder or transmitter 60. Specifically, the I' and Q' signals are low pass filtered to bandwidths of 1.5 and 0.5 MHz, respectively, by means of filters 62 and 64, respectively, and applied to a modulator 66 which quadrature amplitude modulates the signals on a standard color subcarrier to provide a chroma signal C. Delay units 70 and 72 add delay to signal Y' and I' to match the delay imparted to signal Q' by filter 64 to ensure proper registration of the component signals. Chroma signal C and luma signal Y' are combined in an adder 74 and the resultant signal is applied to unit 74 which inserts standard NTSC burst and blanking signals as well as the compression control signal CC in the vertical blanking interval. Signal CC is ultimately used in a wide screen receiver for applying complementary edge expansion to received compressed wide screen images. This information is necessary for wide screen receivers, as previously mentioned, to properly restore the displayed image to its original uncompressed form but is not necessary for standard aspect ratio receivers because of overscan and the psychovisual effect previously discussed (i.e., the uncompressed center portion of the image moves to track action or the center of interest in the scene.)

After insertion of the sync, blanking and compression code signals, the digital signal is converted to analog form in digital-to-analog converter 76, low pass filtered in unit 78 to limit the bandwidth to 4.2 MHz (for reducing D/A conversion noise) and applied to recorder or transmitter 60 via a distribution amplifier 80.

Figure 2:
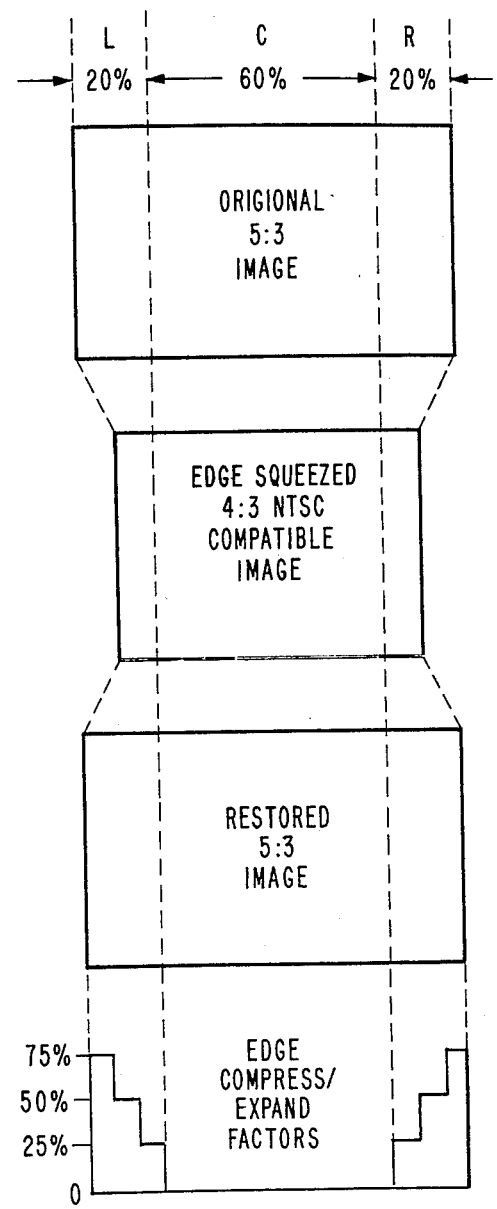

The processed signal S2 conforms to NTSC broadcast standards in all respects except for the compression of left and right edge regions of the picture which varies as a function of compression control signal CC. FIG. 2 illustrates edge compression and expansion for the case where the center of interest is in the middle of a scene. In this case the edge regions are compressed and expanded by equal amounts, that is, the compression and expansion are symmetrically applied. As shown compression is provided in steps of 25, 50 and 75 percent for each of the left (L) and right (R) edges of the original 5:3 aspect ratio wide screen image. Each edge region corresponds to about 20 percent of the image before compression and to about 10 percent of the image after compression. Accordingly, when the compatatible (squeezed) signal is displayed on a standard television receiver (having about 5 percent overscan on each edge) about half of the squeezed portion of the image is hidden from view by the overscan. The hidden half contains the greatest compression. The visible half contains the least compression and has been found to be relatively unnoticeable in the case where the center of interest in a scene corresponds to the center of the picture.

In the present invention the edge compression is varied to ensure that uncompressed center of the processed signal follows the center of interest in a scene. If the action moves to the left the operator adjusts control generator 51 to reduce the left side compression and increase the right side compression proportionally. In a wide screen receiver complementary expansion circuits restore the edge regions to their original widths.

In operation, still considering the case where action is centered in a screen (the equal side-compression case), the wide screen video signal S1 provided by camera 10 has NTSC standard line and field rates. As shown in FIG. 3A, the period of one line is about 63.5 microseconds (10.9 microseconds of blanking and 52.6 microseconds of "active" video). The active video portion of signal S1 is illustrated as comprising 10.5 microseconds for each edge and 31.6 microseconds for the center portion of the image. This corresponds approximately to the factors of 20%, 60% and 20% for the left, center and right portions of the wide screen image illustrated in FIG. 2. By compression, each edge region is reduced to occupy about 10% (5.25 microseconds, FIG. 3E) of the active video interval by deletion of a number, 190, of the write clock pulses as will now be described.

The wide screen digitized component signals Y, I and Q are stored in respective ones of memories 40-44. Each memory has a storage capacity of two lines. As one line is being stored in response to the 1100 FH write clock signal FW, a line previously stored is recovered in response to the 910 FH read clock signal FR. Since A/D converters 20, 22 and 26 are clocked by the 1100 FH write clock, the wide screen video signal (Y, I and Q) comprises 1100 picture elements (pixels) per line after conversion to digital form. The pixels are apportioned between the blanking, center and edges of each line as shown in FIG. 3B. Unit 50 causes pixels to be deleted from each line in the numbers indicated in FIG. 3C by deleting corresponding clock pulses from the write clock. As a result, fewer pixels are stored in the memories than were present in the original signal as shown in FIG. 3D. Accordingly, when the memory is read by the 910 FH read clock (FIG. 3E) the edge regions where write clock pulses are deleted are compressed as a function of the number of pulses deleted without altering the overall horizontal period (63.5 microseconds) of the processed signal.

The specific numbers of pixels deleted shown in FIG. 3C are selected to provide the compression factors (25, 50 and 75 percent) within the edge regions shown in FIG. 2. To provide 25% compression, one out of every four clock pulses is deleted. For 50% and 75% compression factors, two out of four and three out of four sequential clock pulses are deleted, respectively.

Pixels are deleted from the blanking interval without compressing the interval. This results because of the specific choice of the number of pixels deleted with respect to the read and write clock frequencies. Specifically, the time interval represented by 190 pixels at the 1100 FH write clock frequency (10.9 microseconds) is the same as that of 156 pixels clocked at the 910 FH read clock frequency. Thus, deleting 34 pixels in the blanking interval results in no change in the interval length. Deleting more pulses will shorten the interval. Deleting fewer pulses will lengthen it. IF the length of the blanking interval is changed, then a change should be made in the active video interval such that the overall line period remains at the NTSC standard value (about 63.5 microseconds). As an example, if the blanking interval is increased by deleting fewer than 34 write clock pulses, then more pulses should be deleted from the active video interval to compensate for the increased blanking time. The relationship which meets this criteria is that the number of write clock pulses deleted is selected to equal the difference between the number of read and write clock pulses in one line interval. In this example of the invention there are 1100 write clock pulses and 910 read clock pulses, therefore a total of 190 write clock pulses are deleted to prevent changing the line period of the processed output signal.

FIGS. 4A–4E illustrate pixel deletion patterns according to the invention for providing variable edge compression. FIG. 4C is the pattern corresponding to the case just discussed when action is in the center of the screen and compression of the edges is symmetrical. If the action moves to the left, the system operator adjusts compression control generator 51 to decrease the left-side compression and increase the right-side compression as shown by FIGS. 4A and 4B. This moves the center of the compressed signal to the left. Conversely, if action is centered to the right, the system operator adjusts generator 51 to decrease the right-side compression and proportionally increase the left side compression as shown by FIGS. 4D and 4E. This moves the uncompressed center region to the right, as shown, to follow the action. The viewer will also tend to look to the right and so the increased left side compression will be subjectively less visible than it otherwise would be if the side compression were not varied.

FIG. 5 is a detailed block diagram of the memory and control elements 40-50 of FIG. 1. Each of memories 40-44 comprises a pair of 1-H memories (40A, 40B, 42A, 42B etc.). Signals Y, I and Q are applied to the memories and recovered from the memories by six sections (43A-43F) of an eight pole switch. Sections 43G and 43H apply read/write clock signals to the memories. For the switch position shown, signals Y, I and Q are applied to memories 40A, 42A and 44A via sections 43A, 43C and 43E and stored in response to write clock signals developed at AND gate 410 and coupled via switch section 43H. Concurrently, a line of Y, I and Q signals previously stored in memories 40B, 42B and 44B is recovered in response to 910 FH read clock signals provided to terminal 412 and selected by switch section 43G. Sections 43B, 43D and 43F couple the outputs of the memories being read to output terminals. When one line has been recovered, the switch 43 position is changed to place the B memories in the write mode and the A memories in the read mode and the process repeats.

Figure 6A:
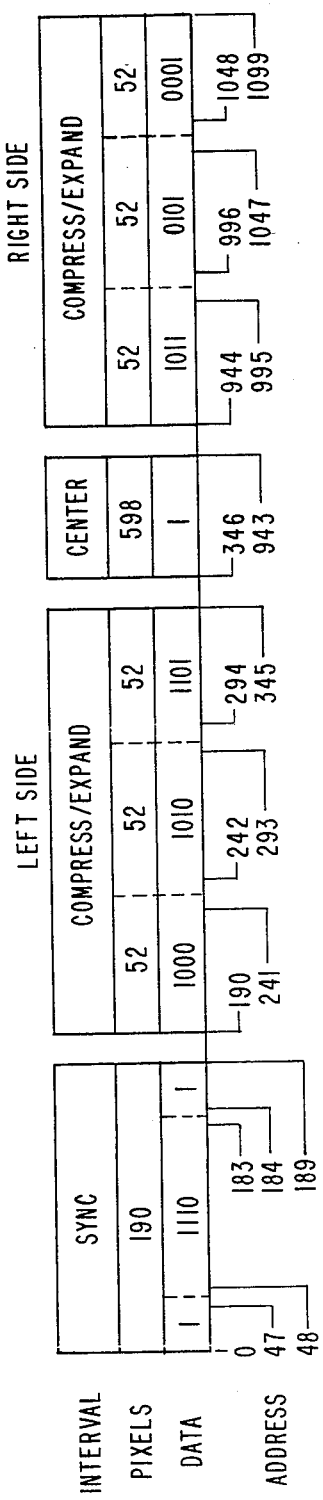
FIGS. 6A and 6B are tables listing contents of a ROM used in the system of FIG. 1.
Figure 6B:
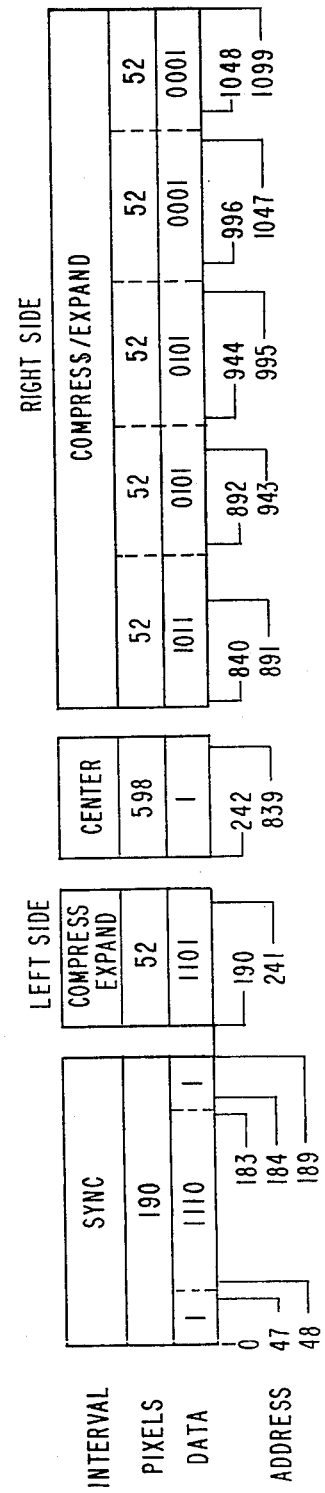

Deletion of the 110 FH write clock pulses is provided by AND gate 410 controlled by ROM 402 as follows. The 1100 FH clock pulses at terminal 416 are applied to gate 410 and to a counter 406. Counter 406 counts the FW pulses to generate address bits A1 to A11 for ROM 402. The counter is reset at the start of each line by line rate pulses FH from terminal 417 completed to timing bus 13. Additional address bits are provided by the compression control signal CC applied to terminal 418 from generator 51. These higher level address bits select different pages in ROM 401 having the pulse deleting patterns shown in simplified form in FIGS. 4A–4E. FIGS. 6A and 6B show specific binary data and addresses for the specific deletion (compression) patterns of FIGS. 4C and 4A, respectively.

Referring to FIGS. 6A and 6B, a "one" in the pattern enables AND gate 410 to pass a 1100 FH pulse. A "zero" causes AND gate 410 to delete a pulse. As shown, in the 4 to 1 compression region (starting at address 190) the delete pattern is "1000". This signifies that the first pulse (address 190) is passed and the following three are deleted. This four bit sequence is repeated until address 242 when the pattern changes to 1010 corresponding to a 50% compression factor. FIG. 6A represents the pattern of deleted pulses for producing equal (symmetrical) compression of the left and right side regions of an image. FIG. 6B provides the pulse deletion pattern which is selected in ROM 402 for the case where action is off center (to the left). As shown, less compression (pulse deletion) is applied to left-side pixels and proportionally more compression is applied to right-side pixels. In FIGS. 6A and 6B the representative patterns are labeled "compress/expand" because the identical bit patterns are used in the expander of the receiver of FIG. 7.

The wide aspect ratio receiver of FIG. 7 includes an antenna terminal 702 for receiving a wide aspect ratio video input signal which will be assumed to be developed as described in connection with FIGS. 1-6. It is a feature of the receiver, as will be seen, that essentially the same hardware and software elements that provide variable edge "squeezing" in the system of FIG. 1 can provide variable edge "de-squeezing" in the receiver.

The wide aspect ratio compatible signal is applied to a tuner, IF amplifier and detector unit 704 of conventional design which provides a baseband composite NTSC video output sinal S3 to an analog decoder unit 706 and to a sync detector 708. Unit 706 converts signal S3 to R,G,B component form. Alternatively, conversion may be to Y, I, Q or some other component form (e.g., Y, R-Y, B-Y). The RGB signals are then digitized by a triple A/D converter 710 checked at a frequency of 910 FH provided by write clock 712. There are thus 910 pixels per line of the digitized signals.

The digitized signals are stored in respective ones of memories 714-718 in response to 910 FH write clock pulses provided by clock 712. All 910 samples of each component are stored. Concurrently, a line previously stored is recovered in response to an 1100 FH read clock 720 in which selected pulses are deleted by means of control unit 750. The deletion patterns (which control the edge expansions) are stored in a ROM in control unit 750 and are selected by means of expansion control signal detector 709 which detects the compression control signal CC in NTSC signal 53 and supplies it as an expansion control signal XC to the ROM in unit 750.

Deleting read clock pulses has the effect on the memory operation of stretching a stored sample in proportion to the length of time that the read clock is "stopped" or, more correctly, "paused". After "de-squeezing" in memories 714–718, the wide screen RGB video signals are converted back to analog form in triple D/A converter (i.e., including three D/A converter sections) 722, low pass filtered by filters 724–728 and applied to a 5X3 aspect ratio display (e.g., a wide screen kinescope or projection device) 730 that is synchronized at standard NTSC line and field rates by means of sweep generator 731.

Figure 4:
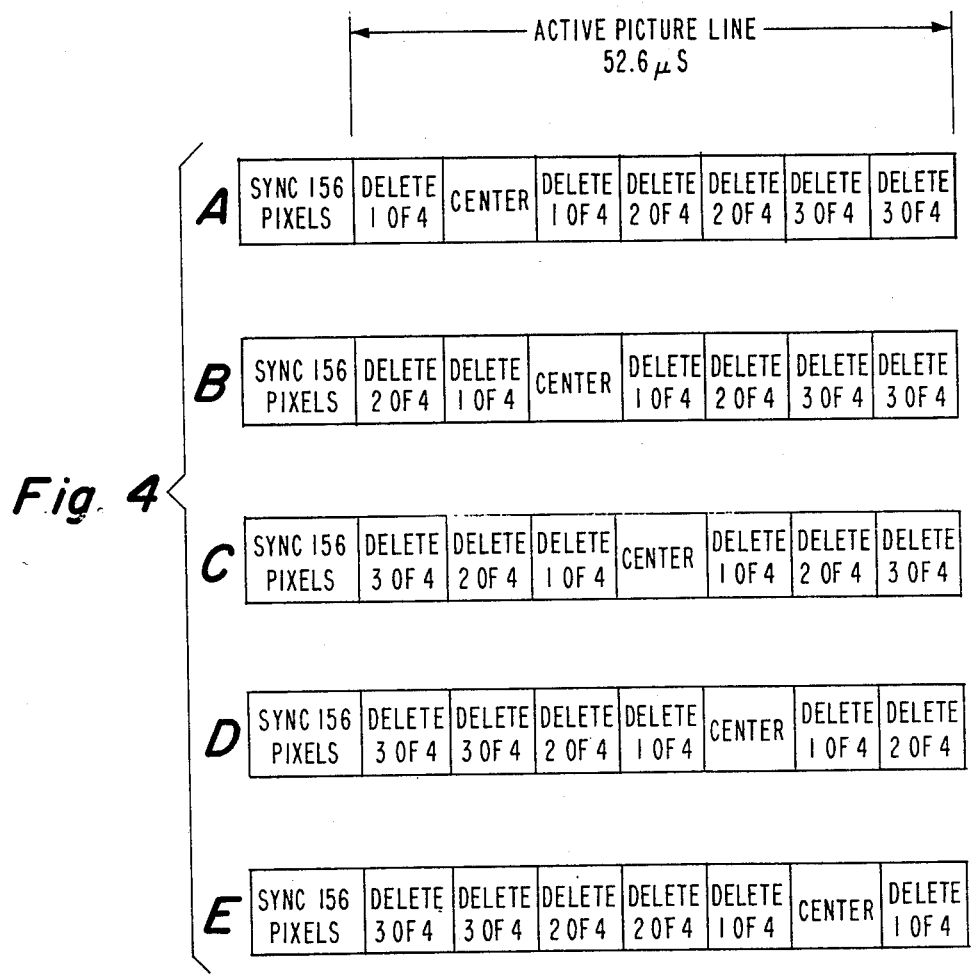
Figure 7:
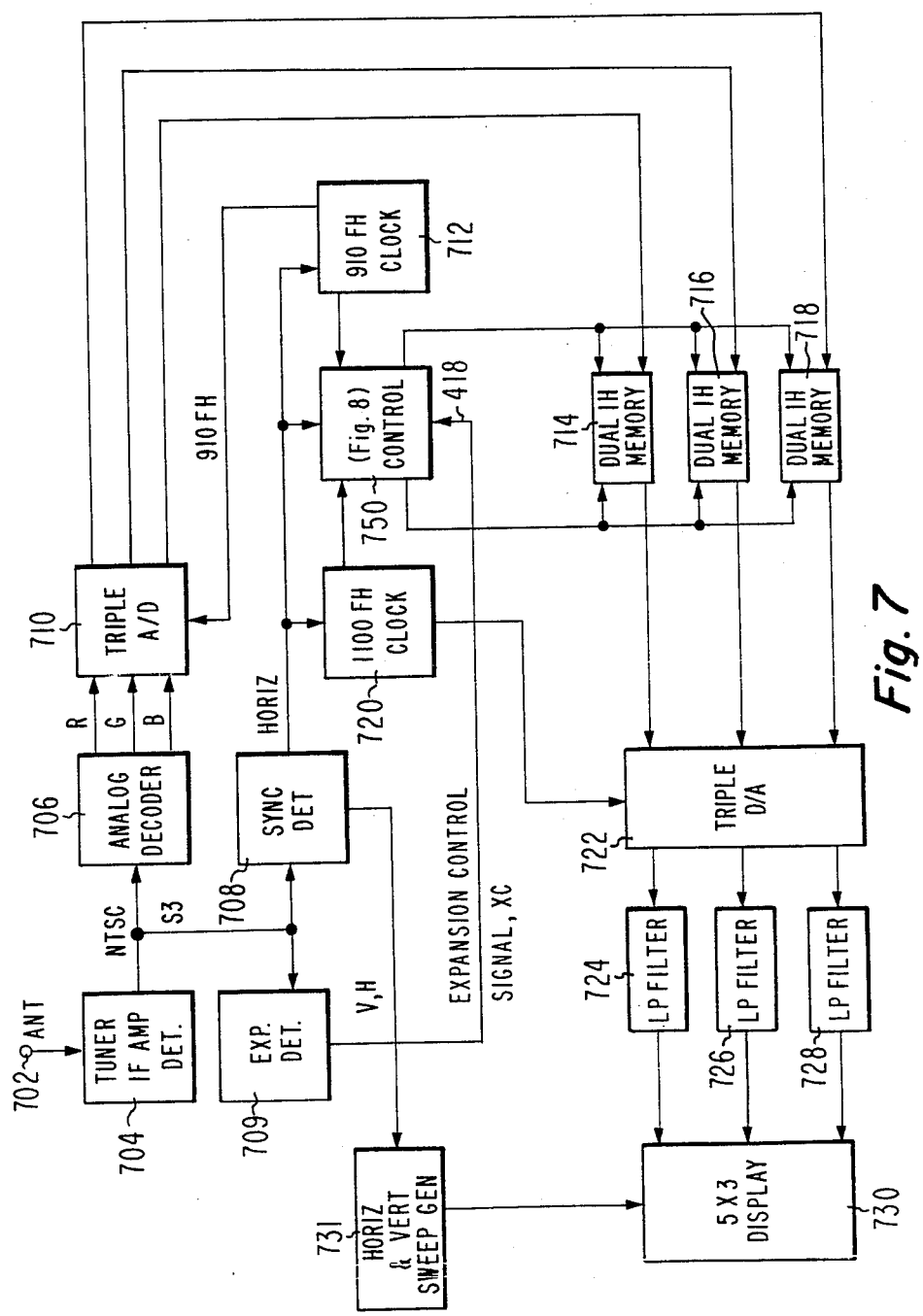
FIG. 7 is a block diagram of a wide screen receiver system embodying the invention.
Figure 8:
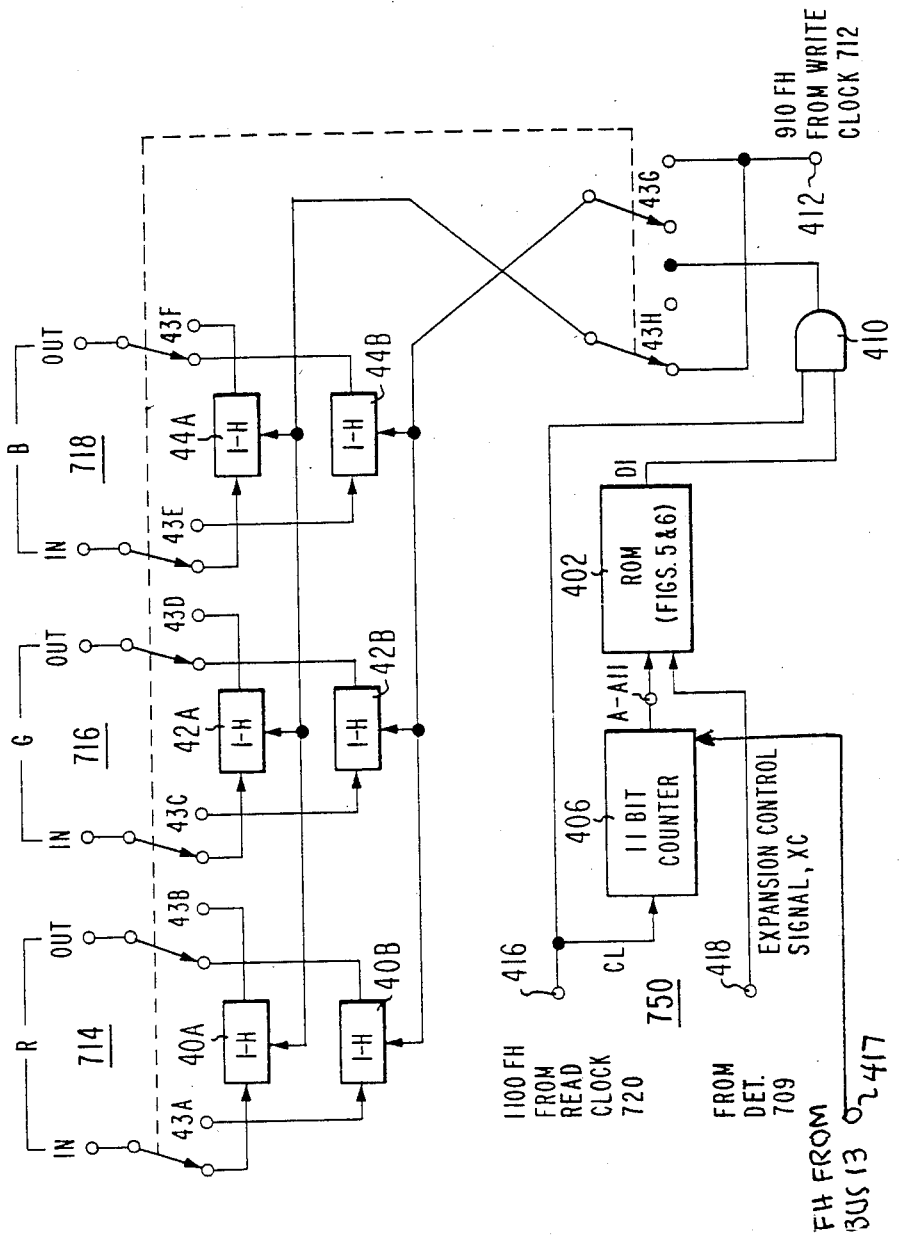
FIG. 8 is a block diagram of an edge expander suitable for use in the receiver of FIG. 7.

Edge expansion (de-squeezing) of the compatible wide screen signal in the receiver of FIG. 7 is analogous to the edge compression technique used in the system of FIG. 1. In fact, as shown in FIG. 8, the identical hardware and software used for compression in FIG. 4 provides expansion in FIG. 8 by simply reversing the read and write clock frequencies and reversing the connections to switch sections 43H and 43G.

To summarize, the one line memories function as previously described to store and recover each line of the video input signal (R, G and B in this case). Control unit 750 is directly analogous to unit 50 except that read clock pulses are deleted rather than write clock pulses and the read and write clock frequencies are reversed. The deletion patterns stored in ROM are the same as in the compression system (see FIGS. 4, 6A and 6B) and provide expansion of the edge regions (as controlled by the expansion control signal XC) which is complementary to the compression applied by the system of FIG. 1.

In the embodiments of the invention described thus far the edge regions of the wide screen image are subjected to compression and expansion at locations and in relative proportions as determined by the bit patterns stored in ROM 402. In certain circumstances it may be desirable to apply uniform compression (and subsequent expansion) to the edge regions and to the central region. One such circumstance is when credits are being shown for a movie. Credits sometimes extend across the full width of the wide screen image. By uniformly compressing the image it is ensured that the credits receive minimum distortion as viewed on a standard aspect ratio receiver and minimum loss of edge resolution when viewed on a wide screen display. Uniform compression (and complementary expansion) may be implemented in accordance with the invention by storing a compression/expansion pattern in ROM 402 which deletes one out of every six cycles of the write clock (for compression) or of the read clock (for expansion) during the active line interval. Exemplary bit patterns are 111110, 111101, etc. To ensure that the total number of pixels (754) in an active line of the uniformly compressed image is the same as in the edge compressed image three out of five clock cycles (e.g., pattern 01010) are dropped at each ends of the active (picture representative) portion of a line. Thus, as shown and described, expansion and compression systems embodying the invention are capable of three operating modes, namely, providing equal edge compression/expansion (for centered action), unequal edge compression/expansion (for off-center action) and uniform compression (for credits, titles, etc.).

What is claimed is:

1. Video image compression apparatus, comprising:
signal source means for providing a video input signal representative of a wide screen image and for providing a compression control signal;
video compression means coupled to said source means for compression left and right edge regions of said wide screen image and for varying relative widths and relative degrees of compression of the left and right compressed edge regions as a function of said control signal to provide a processed video output signal representative of a wide screen image having a central region bordered on left and right sides thereof by compressed edge regions having variable relative and variable relative degrees of compression; and
combining means for combining said processed video output signal with said compression control signal for transmission to a utilization means.

2. Video image compression apparatus as recited in claim 1 wherein said video compression means varies the compression and the width of said edge regions in a complementary manner in response to said control signal with increases in compression and width of one edge region being matched by decreases in compression and width of the other edge region as the compression is varied.

3. Video image compression apparatus as recited in claim 1 wherein said video compression means is responsive to a given condition of said compression control signal for uniformly compressing said edge regions and said central region of said wide screen image represented by said video input signal.

4. Video image compression apparatus as recited in claim 1 wherein said video compression means comprises
sampling means coupled to said signal source means for providing samples of said video input signal;
memory means;
memory control means coupled to said memory means for storing selected samples of said left and right edge regions and all samples of said central region of one line of said samples in said memory means, the relative proportions of the selected samples of the left and right edge regions being controlled in accordance with said compression control signal; and
output means for recovering the stored samples from said memory means to provide said processed video output signal.

5. Video image expansion apparatus, comprising:
signal source means for providing a video input signal representative of a wide screen image having a central region bordered on left and right sides thereof by variably compressed left and right edge regions and for providing an expansion control signal indicative of the relative proportions of compression of said edge regions; and
inverse signal processing means coupled to said signal source means for expanding said edge regions of said video input signal in relative proportions indicated by said expansion control signal to provide a processed video output signal in which said wide screen image is restored to an uncompressed form; and wherein:
said inverse signal processing means has a first operating mode for applying equal expansion to said edge regions, a second operating mode for applying unequal expansion to said edge regions and a third operating mode for applying uniform expansion to said edge regions and to said central region.

6. A wide screen television display system, comprising:
a first source for providing a video input signal representative of a wide screen image having left and right edge regions compressed relative to a central region and having line and field rates conforming to a given broadcast standard, said edge regions having variable widths and variable degrees of compression;

a second source for providing an expansion control signal indicative of said widths and said compression of said edge regions;

video expander means coupled to said sources for expanding said left and right edge regions of said wide screen image and for varying the relative proportions of expansion and said widths of said edge regions as a function of said control signal to provide an expanded video output signal, said expander means having a first operative mode for equally expanding said edge regions and a second operative mode for unequally expanding said edge regions; and display means having an aspect ratio greater than 4:3 and coupled to said expander means for displaying said expanded video output signal.

7. A wide screen television display system as recited in claim 6 wherein said video expander means varies the expansion and the widths of said edge regions in a complementary manner in response to said expansion control signal with increases in the expansion and the width of one edge being substantially matched by decreases in the expansion and width of the other edge as said control signal varies.

8. A wide screen television display system as recited in claim 6 wherein said expansion means is responsive to a given condition of said expansion control signal for uniformly expanding said edge regions and said central region of said wide screen image represented of said expanded video output signal.

9. A compatible wide screen television system comprising:

a first source for providing a video input signal representative of an image having left and right edge regions to be compressed or expanded;

a second source for providing a read clock signal and a write clock signal, each clock signal being of a constant frequency;

first memory means coupled to said sources for storing at least one line of said video input signal in response to said write clock signal and for concurrently recovering at least one previously stored line of said video input signal in response to said read clock signal to provide a video output signal;

clock pulse deleter means coupled to said second source and to said memory means for deleting a predetermined number of pulses of a selected one of said clock signals for causing said memory means to compress or expand said edge regions of said image represented by said video output signal in proportion to the number of clock pulses deleted; and control means for supplying an identification signal to said clock pulse deleter means for selecting clock pulses to be deleted, said identification signal having a first condition for causing equal numbers of clock pulses to be deleted in said edge regions and having a second condition for causing unequal numbers of said clock pulses to be deleted in said edge regions.

10. A system as claimed in claim 9 wherein the frequency of said write clock signal is greater than that of said read clock signal and wherein said clock pulse deleter means is coupled to delete pulses of said write clock for causing said memory means to variably compress said edge regions of said image in accordance with said identification signal.

11. A system as recited in claim 9 wherein the frequency of said read clock signal is greater than that of said write clock signal and wherein said clock pulse deleter means is coupled to delete pulses of said read clock signal for causing said memory means to variably expand said edge regions of said image in accordance with said identification signal.

12. Video image compression apparatus, comprising:

signal source means for providing a video input signal representative of a wide screen image and for providing a compression control signal;

video compression means coupled to said source means and responsive to a first condition of said control signal for uniformly compressing left-edge, center and right-edge portions of said wide screen image, and responsive to a second condition of said control signal for increasing the compression applied to said edge regions to provide a processed video output signal having a central region bordered by variably compressed edge regions;

combining means for combining said processed video output signal with said compression control signal for transmission to a utilization means; and wherein:

said video compression means being responsive to said control signal for varying relative widths and relative degrees of compression of said left-edge and said right-edge portions of said processed video output signal.

13. Video image expansion apparatus, comprising:

signal source means for providing a video input signal representative of a wide screen image having a variably compressed central region bordered on left and right sides thereof by left and right edge regions, said edge regions having variable relative widths and variable relative degrees of compression and for providing an expansion control signal indicative of the compression and widths of said regions; and inverse signal processing means coupled to said signal source means for variably expanding said regions of said video input signal in relative proportions and widths indicated by said expansion control signal to provide a processed video output signal in which said wide screen image is restored to an uncompressed form.

* * * * *